United States Patent
Joshi et al.

(10) Patent No.: US 10,193,650 B2
(45) Date of Patent: Jan. 29, 2019

(54) AUTOMATED, DYNAMIC MINIMIZATION OF INTER-CELL SITE INTERFERENCE IN CDMA NETWORKS

(71) Applicant: Telefonaktiebolaget LM Ericsson (publ), Stockholm (SE)

(72) Inventors: Monil Joshi, Windsor (CA); Nader El Chebib, Whitter, CA (US); Jad El-Najjar, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 133 days.

(21) Appl. No.: 15/125,392

(22) PCT Filed: Mar. 14, 2014

(86) PCT No.: PCT/IB2014/059806
§ 371 (c)(1),
(2) Date: Sep. 12, 2016

(87) PCT Pub. No.: WO2015/136332
PCT Pub. Date: Sep. 17, 2015

(65) Prior Publication Data
US 2017/0214481 A1    Jul. 27, 2017

(51) Int. Cl.
*H04J 13/16* (2011.01)
*H04W 72/04* (2009.01)
(Continued)

(52) U.S. Cl.
CPC .............. *H04J 13/16* (2013.01); *H04J 11/005* (2013.01); *H04W 72/0466* (2013.01);
(Continued)

(58) Field of Classification Search
None
See application file for complete search history.

(56) References Cited

U.S. PATENT DOCUMENTS 7,916,667 B2    3/2011    Payne et al.
8,306,164 B2    11/2012   Farag et al.
(Continued)

FOREIGN PATENT DOCUMENTS

WO    2009082307 A1    7/2009

OTHER PUBLICATIONS

3GPP, "3rd Generation Partnership Project; Technical Specification Group Radio Access Network; Requirements for support of radio resource management (FDD) (Release 11)", 3GPP TS 25.133 V11.4.0, Mar. 2013, 1-285.
Checco, Alessandro et al., "Self-Configuration of Scrambling Codes for WCDMA Small Cell Networks", 2012 IEEE 23rd International Symposium on Personal Indoor and Mobile Radio Communications (PIMRC), Sep. 2012, 1-6.
Griparis, Thrasivoulos et al., "A Novel Code Planning Approach for a WCDMA Network", Bechtel Telecommunications Technical Journal, vol. 3, No. 1, Aug. 2005, 46-53.
(Continued)

*Primary Examiner* — Duc T Duong
(74) *Attorney, Agent, or Firm* — Murphy, Bilak & Homiller, PLLC

(57) ABSTRACT

Methods and apparatus for allocating scrambling codes to cells of a wireless network. In an example method, current scrambling code allocation information for a plurality of cells and network configuration information for a radio access network are received (310). A reallocation of scrambling codes to the plurality of cells is computed (320), based on the current scrambling code allocation information and the network configuration information, using a metaheuristic algorithm. A change in scrambling code for at least one of the plurality of cells is then triggered (330), based on the computed reallocation. In some embodiments, the metaheuristic algorithm is based on an objective function that comprises a summation of interference metrics for each of (Continued)

the plurality of cells, wherein the interference metrics depend on scrambling code allocations to the plurality of cells. In some embodiments, a simulated annealing meta-heuristic is used.

24 Claims, 5 Drawing Sheets

(51) Int. Cl.
*H04J 11/00* (2006.01)
*H04W 72/08* (2009.01)
*H04L 12/24* (2006.01)
*H04W 88/08* (2009.01)

(52) U.S. Cl.
CPC ........... *H04W 72/082* (2013.01); *H04L 41/08* (2013.01); *H04W 88/08* (2013.01)

(56) References Cited

U.S. PATENT DOCUMENTS

| | | | |
|---|---|---|---|
| 8,559,345 B2 | 10/2013 | Carmon et al. | |
| 2007/0093267 A1* | 4/2007 | Hosono | H04W 16/10 455/561 |
| 2010/0093351 A1* | 4/2010 | Barrett | H04W 36/0083 455/436 |
| 2010/0210258 A1* | 8/2010 | Nylander | H04W 16/10 455/422.1 |
| 2012/0192020 A1 | 7/2012 | Kreuchauf et al. | |
| 2012/0219155 A1* | 8/2012 | Drugge | H04B 1/70735 380/287 |
| 2014/0004851 A1* | 1/2014 | Fix | H04B 1/707 455/425 |
| 2014/0029521 A1 | 1/2014 | Puthenpura et al. | |

OTHER PUBLICATIONS

Jones, R. A. et al., "Assignment of Spreading Codes in DS-CDMA UWB Systems", IEEE 2003 Conferences on Ultra Wideband Systems and Technologies, Nov. 16-19, 2003, 359-363.

Jung, Young-Ho et al., "Scrambling Code Planning for 3GPP W-CDMA Systems", IEEE VTS 53rd Vehicular Technology Conference, May 6, 2001, 1-4.

Ye, Wen et al., "Mining of Reuse Patterns in CDMA Network Optimization", IEEE 2007, Eighth ACIS International Conference on Software Engineering, Artificial Intelligence, Networking, and Parallel/Distributed Computing, Jul. 1, 2007, 1011-1016.

* cited by examiner

AUTOMATED, DYNAMIC MINIMIZATION OF INTER-CELL SITE INTERFERENCE IN CDMA NETWORKS

TECHNICAL FIELD

The present invention generally relates to wireless communication networks, and more particularly to the allocation of scrambling codes among cells of a wireless communication network that uses code-division multiple access (CDMA).

BACKGROUND

In the Wideband Code-Division Multiple Access (W-CDMA) networks developed by members of the 3rd-Generation Partnership Project (3GPP), so-called scrambling codes are used to differentiate between downlink signals transmitted by neighboring cells in the network, as well as to differentiate between uplink signals transmitted to the cells by mobile stations in a given area. Generally, these scrambling codes are assigned to the cells in the network by the network operator, using any of various cell planning tools.

Scrambling codes are also known as pseudo-noise codes and are one of two spreading codes groups used in W-CDMA systems. The other type of code used in W-CDMA system is the channelization code, which is used for channel separation of one transmission from another. Coding of subscriber information is achieved by "multiplying" the transmitted information with channelization and scrambling codes. More particularly, after the channelization codes is applied to user data to map the user data to a CDMA channel, the data stream is multiplied by a code from a group of special binary codes, to distinguish between different transmitters, which are in turn mapped to cells. The code gives a unique user equipment (UE)/base station (BS) identity. This process is referred to as "scrambling" and the codes used for this process are hence called "scrambling codes." The codes used are selected to produce a low correlation value when correlated with other codes, which provides a good separation between multiple transmission sources.

In a basic W-CDMA network, since all transmitters are on the same frequency there is no need for frequency planning. However, adequate physical separation is required between cells that are using the same scrambling codes. There are 512 unique scrambling codes used in W-CDMA. Hence there is a need to maintain uniqueness of scrambling codes between adjacent W-CDMA cells.

W-CDMA handover decisions are taken by a Radio Network Controller (RNC) based on radio measurement data obtained by the user equipment (UE-3GPP terminology for a mobile terminal or access device) and reported to the network. These measurements are performed to determine the quality (e.g., signal strength) of transmissions from the cell or cells that are serving the UE, as well as of transmissions from nearby cells. The RNC keeps track of neighbor relations between the various cells managed by the RNC; these configured neighbor definitions in the RNC are used to inform the UE of which scrambling codes must be measured. The 3GPP-defined message containing a measurement order from the RNC to the UE has room for 32 IAF (intra-frequency) cells, including the active set cells. The ability for the RNC to transfer neighbor relation information is limited to this number of neighbors. This is an important restriction that needs to be taken into consideration when planning the IAF neighbor relations.

3GPP specifications for W-CDMA operation also require the UE to find other strong cells apart from the ones requested by the RNC. However, the performance requirements for these measurements are less strict in comparison with what is required for the IAF monitored subset.

The RNC and UE communicate cell identities through scrambling codes. Since scrambling codes are re-used throughout a network, it is not a unique identifier. With the configured neighbor definitions, the RNC is able to uniquely identify a cell by verifying that the reported scrambling code is in the list of neighbors. The configured neighbor relations are used to identify the scrambling codes the UE should measure among the 512 possible, when looking for handover candidates in dedicated mode and cell selection/reselection in idle mode.

The scrambling code assigned to each cell must therefore be unique with respect to scrambling codes assigned to other cells having an adjoining boundary with the cell. These codes must be unique to avoid collisions with the neighboring cell's downlink signals.

In current W-CDMA system implementations, the scrambling codes are usually assigned through a manual process by the network operator, using cell planning tools that group and partition the scrambling codes and cluster these groups for macro- and micro-base station deployments. These scrambling code groups can then be assigned on a per cell site basis, to ensure both scrambling code uniqueness and an ability to re-use these groups efficiently.

Since the allocation of the scrambling code is a manual procedure, it is subject to human errors. A failure to maintain unique scrambling codes between adjacent cells could lead to false preamble detection for mobile stations from adjacent cells, and increase inter-cell site interference. Increased inter-cell site interference in turn can lead to a reduction in throughput and/or connectivity issues with mobile stations. In a deployment with thousands of base stations, it is not difficult to envisage a situation where human error may lead to cell site planning issues. Hence, there is a need for improved techniques for ensuring an efficient allocation of the scrambling codes between cell sites, while reducing or eliminating the need for operator intervention.

SUMMARY

Methods and apparatus for allocating scrambling codes to cells of a wireless network are detailed herein. In one example method, current scrambling code allocation information for a plurality of cells and network configuration information for a radio access network are received. A reallocation of scrambling codes to the plurality of cells is computed, based on the current scrambling code allocation information and the network configuration information, using a metaheuristic algorithm. A change in scrambling code for at least one of the plurality of cells is then triggered, based on the computed reallocation. In some embodiments, the metaheuristic algorithm is based on an objective function that comprises a summation of interference metrics for each of the plurality of cells, wherein the interference metrics depend on scrambling code allocations to the plurality of cells. In some embodiments, a simulated annealing metaheuristic is used.

Related methods for detecting and correcting problems with scrambling code allocations among cells supported by a group of base stations in the wireless network are also detailed herein. In an example of such methods, an initial one of the group of base stations is designated a source base station. In some embodiments, the designated base station is one of those base stations affected by a change in scrambling code allocations. A first set of scrambling codes is then identified, the first set of scrambling codes consisting of all scrambling codes allocated to cells supported by the source base station. In embodiments triggered by a reallocation of scrambling codes, the identified set of scrambling codes reflects the one or more changes to be made to the current scrambling code allocation. A second set of scrambling codes is determined, the second set of scrambling codes comprising at least all scrambling codes allocated to cells neighboring any of the cells supported by the source base station.

Next, the first and second sets of scrambling codes are compared, to detect duplicate scrambling codes between the first and second sets. Upon detection of a duplicated scrambling code between the first and second sets, location information for the cells corresponding to the duplicated scrambling code is used to determine whether interference between the cells is likely and, if interference is likely, the scrambling code is changed for the cell that has the duplicated scrambling code and that is supported by a base station other than the source base station. A next one of the base stations is selected for designation as the source base station, and the identifying, determining, comparing, using, changing, and selecting operations summarized above are repeated until each one of the base stations has been designated as the source base station.

Network node apparatus adapted to carry out any of the several techniques summarized above, and variants thereof, are also disclosed in the detailed discussion that follows. Of course, the present invention is not limited to the above-summarized features and advantages. Indeed, those skilled in the art will recognize additional features and advantages upon reading the following detailed description, and upon viewing the accompanying drawings.

BRIEF DESCRIPTION OF THE DRAWINGS

In the drawings, like reference numerals designate corresponding similar parts, operations, or system components. The features of the various illustrated embodiments can be combined unless they exclude each other. Embodiments of the presently disclosed methods and apparatus are depicted in the drawings and are detailed in the description that follows.

DETAILED DESCRIPTION

Figure 1:
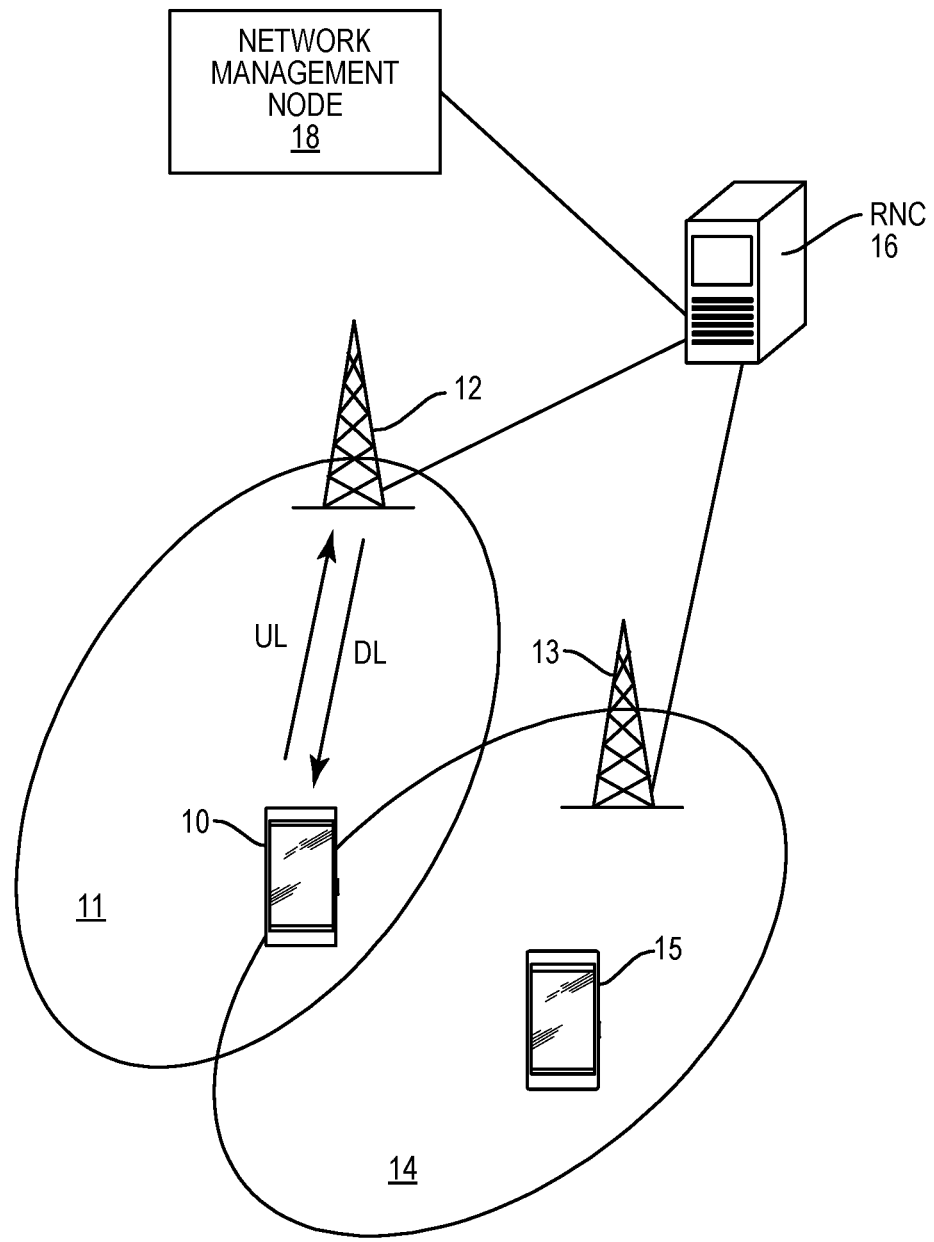
FIG. 1 is a schematic diagram of a W-CDMA network include a network management according to embodiments of the presently disclosed methods and apparatus.

Within the context of this disclosure, the terms "mobile station," "mobile terminal," "wireless terminal," or "wireless device" refer to any terminal that is able to communicate wirelessly with an access node of a wireless network by transmitting and/or receiving wireless signals. Thus, the term "mobile station," for example, encompasses, but is not limited to: a user equipment (UE), as that term is used in 3GPP specifications for W-CDMA and other networks, whether that user equipment is a cellular telephone, smartphone, wireless-equipped tablet computer, etc.; a stationary or mobile wireless device for so-called machine-to-machine (M2M) communication or machine-type communication (MTC); or an integrated or embedded wireless card forming part of a computer or other electronic equipment; a wireless card, dongle, or the like, for plugging in to a computer or other electronic equipment. Throughout this disclosure, the terms "user equipment" and "UE" are sometimes used to exemplify various embodiments. However, this should not be construed as limiting, as the concepts illustrated herein are equally applicable to other wireless terminals. Hence, whenever a "user equipment" or "UE" is referred to in this disclosure, this should be understood as encompassing any mobile terminal or wireless terminal as defined above. Likewise, the terms "base station," "NodeB," "evolved NodeB," "eNB," "radio base station," or the like are used to refer to an access point of a wireless communication network, which communicates with one or more mobile stations via radio communications.

In the discussion that follows, specific details of particular embodiments of the presently disclosed techniques and apparatus are set forth for purposes of explanation and not limitation.

It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes.

Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the terms "processor" and "controller" may also refer to other hardware capable of performing such functions and/or of executing software, such as the example hardware recited above.

References throughout the specification to "one embodiment" or "an embodiment" mean that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

While the following examples are described in the context of W-CDMA systems, the principles described in the following disclosure may be equally applied to other functional contexts and other cellular networks that use scrambling codes.

FIG. 1 is a simplified schematic of a radio communications network, such as a WCDMA network, or similar. The radio communications network comprises a radio network node, e.g. a first radio base station 12, providing radio coverage over at least one geographical area forming a cell, a first cell 11. The definition of a cell may also incorporate the frequency band used for transmissions, which means that two or more different cells may cover the same geographical area, but using different frequency bands. A first user equipment 10 is served in the first cell 11 by the first radio base station 12 and may be communicating with the first radio base station 12. The first user equipment 10 transmits data over an air or radio interface to the first radio base station 12 in uplink (UL) transmissions and the first radio base station 12 transmits data over an air or radio interface to the first user equipment 10 in downlink (DL) transmissions. The illustrated radio communications network further comprises a second radio base station 13 controlling a second cell 14, which is serving a second user equipment 15. The first radio base station 12 and the second radio base station 13 are controlled by a controlling radio network node, illustrated as a Radio Network Controller (RNC) 16. A wireless network may include many RNCs, each controlling several base stations.

Also shown in FIG. 1 is a network management node 18, which is a computerized node that is connected to each of a plurality of RNCs in the wireless communication network, including RNC 16. Network management node 18 provides the system operator with access to each of the RNCs for the purposes of system configuration and management. Among other things, network management node 18 is configured to direct the allocation of scrambling codes to base stations that are under the control of the RNCs. As described in further detail below, network management node 18 in some embodiments is configured to obtain scrambling code allocation information, neighbor cell information, and other information from each RNC, and to analyze the information to determine whether scrambling code allocations should be changed. If changes are necessary, network management node 18 communicates those changes to the RNCs, which in turn communicate the changes to the base stations under their control.

Figure 2:
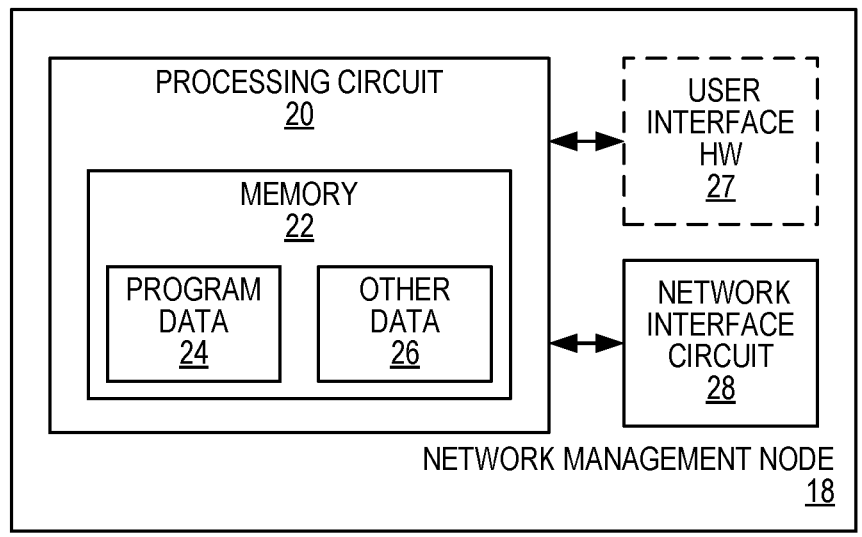
FIG. 2 is a block diagram illustrating features of an example network management node according to the presently disclosed techniques and apparatus.

FIG. 2 illustrates details of an example network management node 18 to which, in which, and with which the presently disclosed techniques may be applied. In an example configuration, the network management node 18 is a computerized platform having a network interface circuit 28 that allows system management node 18 to communicate with RNCs or similar network nodes in a wireless communication network, so that configuration information can be exchanged between system management node 18 and those RNCs or other network nodes. Network management node 18 may be a stand-alone platform, in some embodiments, or may be combined with other network management functionalities. In some embodiments, network management node 18 may comprise user interface circuitry 27, allowing for direct interaction with network management node 18. This user interface circuitry 27 may comprise conventional displays, keyboards, and/or other input and output devices. In other embodiments, operator interaction with network management node 18 may be limited to interaction through remotely connected computers, connected to system management node 18 through the network interface circuit 28 which may be arranged to support, for example, IP-based data communications over any of one or more wired or wireless network interfaces, such as an Ethernet and/or wireless local-area network (WLAN) interface. Some embodiments of network management node 18 may support both remote interaction (through network interface 28) as well as local interaction (through user interface hardware 27).

In the illustrated example, network management node 18 includes a processing circuit 20, which in turn includes associated memory/storage 22. The memory/storage 16 may be one or more types of computer-readable medium, such as a mix of volatile, working memory and non-volatile configuration and program memory or storage. In the example shown in FIG. 2, program data 24 and other data 26 are stored in memory 22. In some embodiments, program data 24 comprises computer program instructions that, when executed by processing circuit 20, cause the processing circuit to carry out one or more of the several techniques described herein for allocating scrambling codes and/or adjusting the allocation of scrambling codes in a wireless network. Of course, processing circuit 20 is further configured, e.g., with appropriate program instructions and/or with appropriate hardware, to control, send data to, and receive data from, user interface hardware 27 and network interface 28.

While FIGS. 1 and 2 illustrate a stand-alone network management node 18 that communicates with one or more radio network controllers 16 and that is configured to carry out one or more of the techniques detailed herein for reallocating scrambling codes and/or for detecting and correcting problems with scrambling code allocations, the same techniques may be implemented in one or more existing network nodes, in some embodiments. For example, an existing radio network controller (RNC) design may be adapted so that the RNC is configured to carry out one or more of the techniques described herein in addition to carrying out its normal RNC functions. It will be appreciated that the block diagram of FIG. 2 applies to such cases as well, but that the processing circuit 20 in such cases may be further configured to carry out network operations that are generally unrelated to the techniques described herein.

As noted above, in current W-CDMA system implementations, the scrambling codes are usually assigned through a manual process by the network operator. Since the allocation of the scrambling code is a manual procedure, the process is open to human errors. If scrambling codes are not unique between adjacent cells, false preamble detections by mobiles from adjacent cells may occur, and inter-cell site interference is increased. Increased inter-cell site interference can lead to a reduction in throughput and/or connectivity issues with UEs.

In a deployment with thousands of base stations, it is not difficult to envisage a situation where human error may lead to cell site planning issues. Hence, techniques for scrambling code allocation that will reduce or eliminate the need for operator intervention while ensuring efficient allocation of the scrambling code between cell sites are needed. In addition, techniques for detecting and correcting problems with duplicated scrambling are needed.

Existing solutions based either on manual assignments of scrambling codes or semi-automated techniques for assigning scrambling codes have critical drawbacks. First, even if quality algorithms are used to automatically assign the scrambling codes during initial site planning, the allocations are still prone to future changes by operators. Since the scrambling code is adjustable on a per-cell basis, it is possible that an operator may modify the scrambling code during a subsequent site maintenance activity. This can lead to errors in allocating the scrambling code. Re-running the algorithm would lead to a longer site maintenance window and affect service for users already being served under W-CDMA cells.

If the allocations are manually planned, the scrambling code sequence is subject to human error. For example, a database must be maintained with scrambling code entries for each cell. Any mistakes in allocating the scrambling code will lead to inter-cell site interference, if the cells are adjacent to each other.

Therefore an automated and periodic approach to allocating the scrambling codes is required, since these codes must be unique between cells to ensure no impact to UE mobility and activity, and since the allocations must reflect changes in network configuration over time.

Accordingly, embodiments of the present invention include methods of automatically allocating scrambling codes by a network manager node that is used to administer the cells in a given portion or all of a radio access network (RAN). The network manager according to these embodiments will periodically traverse the configured cell sites and check to ensure that there is no-overlap of the scrambling code sequence between adjacent cells. Adjacent cells are determined by the Automatic neighbor relations (ANR) configured on the RNC, as well as cell site location information available from the network plan in the network manager. Cell site location information helps ensure that the scrambling code is unique between adjacent cells, in the event that the ANR entries are incorrectly configured by the network operator. Cell radius is compared between cell sites configured amongst the cells in the network plan, to ensure that any overlapping cells have unique scrambling codes.

Figure 3:
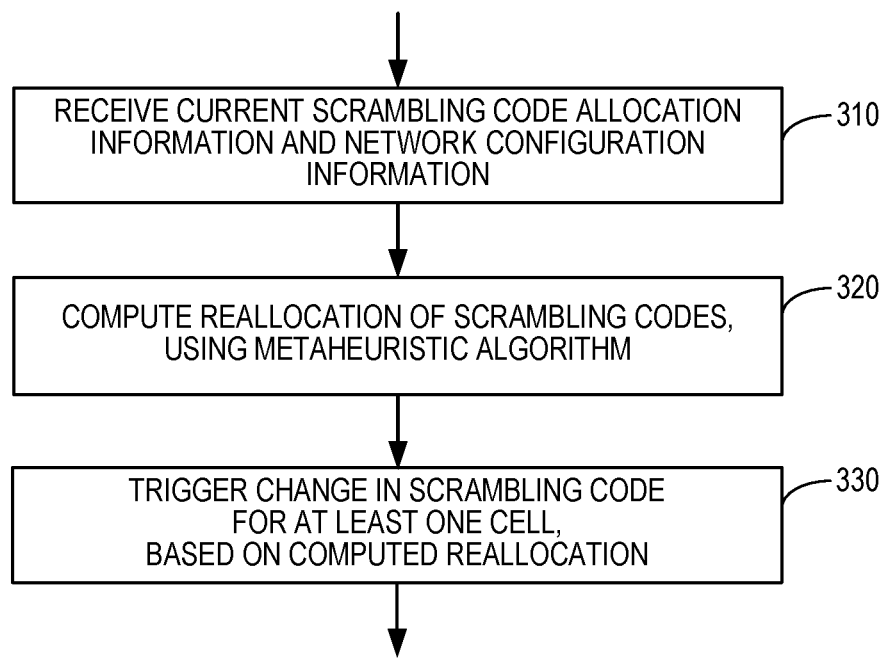
FIG. 3 is a process flow diagram showing an example method for reallocating scrambling codes according to some embodiments of the presently disclosed techniques.

According to some embodiments of this approach, a network manager node operatively connected to a RAN carries out a process for allocating scrambling codes to cells in the RAN. An example of such a process is shown in FIG. 3.

As shown at block 310, the network manager node receives network configuration information that defines the configuration of RNCs and cell sites in the network. This information may be received via configuration information input by operator personnel, and/or may be received and/or updated via information received directly from the involved RNCs or other network nodes. The network manager node also receives current scrambling code allocation for the cells in the network or in the portion of the network to be managed—again, this information may be received from the RNCs, for example.

Using this information, the network manager node parses through the RNCs configured in the cell site plan and through the cells managed by the node and computes a reallocation of scrambling codes to cells, using a metaheuristic algorithm. This is shown at block 320. As shown at block 330, the network manager node then triggers any changes in scrambling codes that are needed, based on the computed reallocation. This triggering may involve sending reconfiguration messages to one or more affected RNCs, for example, using existing 3GPP-defined interfaces or other communications interfaces to the RNCs.

Note that the scrambling code reallocation methods described herein can be implemented as a feature within the network manager, and performed on a regular or periodic basis, or can be invoked during site planning. Since the end result is the configuration of RNCs in such a way that duplication of scrambling codes is avoided, the implementation is flexible.

In some embodiments of the process shown in FIG. 3, after the reallocation has been computed, the computed reallocation is tested to ensure that that there are no duplicated scrambling codes among neighboring cells. Specific techniques for carrying out this test are described in detail below, in connection with FIG. 5.

In some embodiments, neighbor cells for at least some of the plurality of cells are determined based at least in part on neighbor cell information obtained from one or more radio network controllers (RNCs). In some of these and in some other embodiments, neighbor cells are determined for at least some of the plurality of cells based at least in part on geo-positioning information for at least some of the plurality of cells.

In some embodiments, at least the computing operation illustrated at block 320 is repeated at pre-determined intervals. In this manner, the reallocation of scrambling codes can be carried out as a background maintenance task. In other embodiments or in some instances, the computing and triggering operations shown in blocks 320 and 330 are initiated in response to a problem detection in the RAN. Similarly, the computing and triggering operations shown in blocks 320 and 330 may be initiated in response to an addition of a new cell to the RAN, in some embodiments or in some instances.

In some embodiments, the metaheuristic algorithm used for computing the reallocation of scrambling codes is based on an objective function that comprises a summation of interference metrics for each of the plurality of cells, where the interference metrics depend on scrambling code allocations to the plurality of cells. The metaheuristic algorithm seeks to optimize the objective function over all possible states s of the network, where each state s reflects a possible allocation of scrambling codes to all of the cells in the network or in the relevant portion of the network.

One example of such an objective function C(s) is given below:

$$C(s) = \Sigma_i RNC_i(\Sigma_j NodeB_j(\Sigma_k Cell_k ICI_{kji}))*y(s),$$

where $ICI_{kji}$ represents the inter-cell interference (ICI) at the k-th cell of the j-th NodeB managed by the i-th RNC of the RAN. In this case, the objective is to minimize the total inter-cell interference, so the objective of the metaheuristic algorithm is to minimize C(s). $ICI_{kji}$ is estimated for a given allocation of scrambling codes that correspond to a system state s; in the expression above, y(s) is an integer variable that is equal to 1 if state s is chosen, and is 0 otherwise. Note that the estimation of the inter-cell interference may reflect any of a variety of performance data (e.g., key-performance indicators, or KPIs) collected for the affected nodes, such as cell data traffic, the number of UEs attached to a cell and/or its neighbors in recent observations, with neighboring cells impacting more. The estimate of the inter-cell interference may also reflect collected network configuration information—for instance, cell power levels, cell locations, antenna orientations, and the like may be considered. Also note that $RNC_i$, $NodeB_j$, and $Cell_k$ are optional weights that allow the objective function to reflect relative priorities among the RNCs, NodeBs, and cells of the network.

The formulation of the objective function may reflect all of the base stations in a RAN or only a portion of the RAN. The objective function could be targeted to optimization of a particular geographic market, such as a city, for example.

Figure 4:
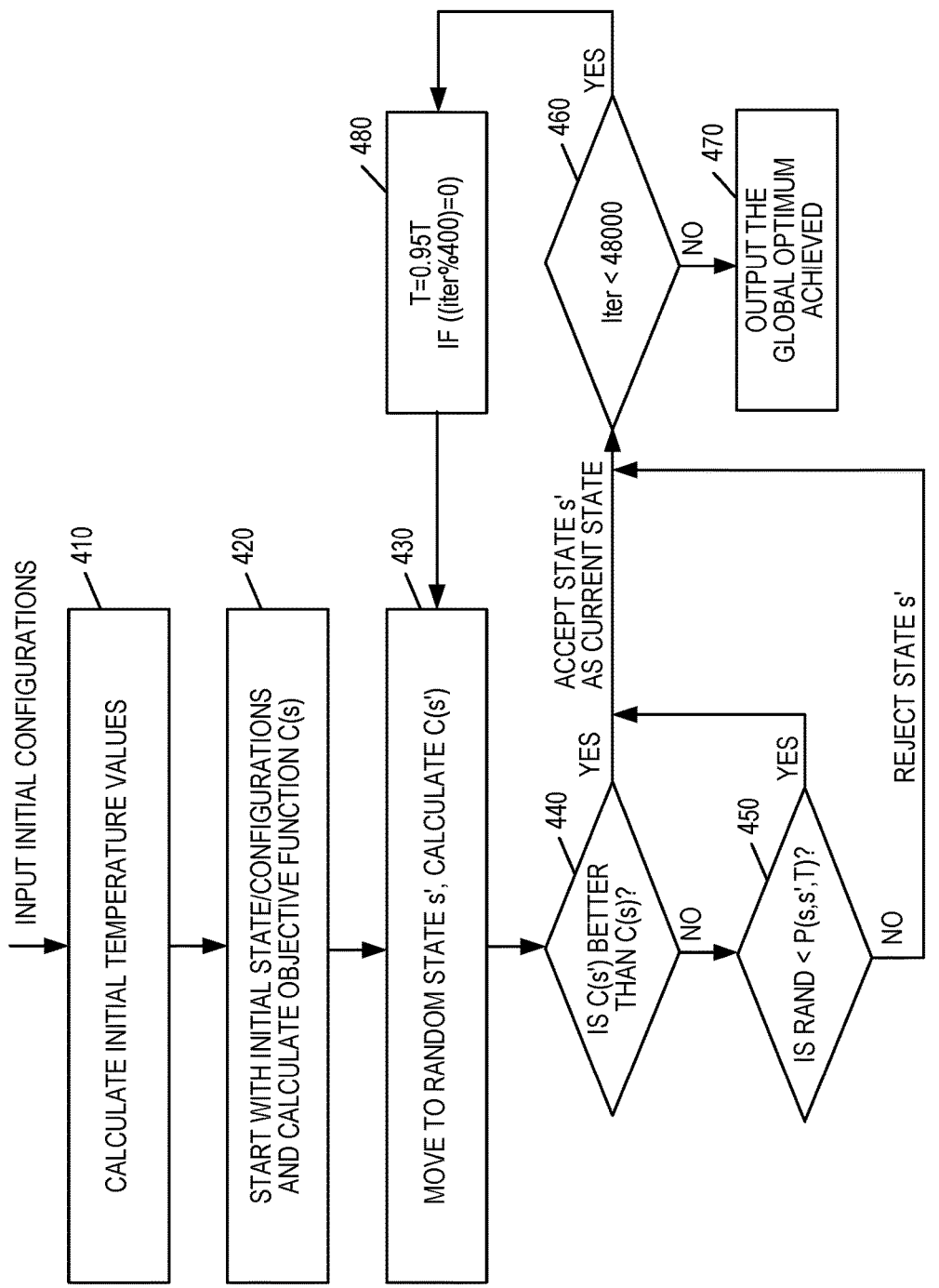
FIG. 4 is a process flow diagram illustrating an example implementation of a metaheuristic algorithm for reallocating scrambling codes.

FIG. 4 illustrates an example metaheuristic algorithm as applied to the present problem of reallocating scrambling codes among cells in a radio access network. The illustrated algorithm employs the well-known simulated annealing metaheuristic, which employs a "temperature"-based strategy to avoid local minima. The basic idea of the simulated annealing metaheuristic is to allow some changes in state that result in worse results than a current solution, to escape from local minima in a search space with a complex shape. These changes can be regarded as "uphill" changes. The probability of such a change decreases over time, as the temperature of the process "cools." Other metaheuristics may be used instead of or along with the simulated annealing metaheuristic, in other embodiments.

Referring to FIG. 4, it can be seen that the process begins with the initial configuration s (i.e., the initial allocation of scrambling codes). As shown at block 410, an initial temperature value T is selected or calculated. As shown at block 420, an initial value C(s) of the objective function is calculated. Note that in some embodiments, the process may start at an arbitrary predetermined temperature, while in others the starting temperature may be calculated based on the initial value C(s) of the objective function. In the latter case, of course, the objective function calculation shown at block 420 must be performed before the initial temperature T is obtained.

As shown at block 430, the process continues with moving to a random state s', by changing one or more scrambling code allocations from the previous state, and calculating the value of the randomly selected state s', i.e., C(s'). In some embodiments, a predetermined number of scrambling codes are changed at each iteration; in some embodiments only a single scrambling code is changed at each iteration. The particular scrambling code to be changed can be selected completely randomly from among all the cells in the area subject to optimization, in some embodiments. In others, a scrambling code to be changed may be selected at random from those corresponding to cells at one or a few predetermined base stations, or from those cells managed by a particular RNC. In some embodiments, a particular base station or RNC to be focused on may be identified in response to a detected network performance problem at or near the selected nodes, for example.

In some embodiments, possible scrambling code changes are tested before the process continues, to ensure that the change or changes do not result in any duplications among the modified cell and its neighbors. In other words, the selection of a random state s' is constrained so as to avoid duplicate scrambling codes among neighbors. In other embodiments, concerns about duplicate scrambling codes are handled later.

As shown at block 440, the objective function value C(s') for the candidate state s' is compared to the objective function value C(s) for the previous state, which in the first iteration will be the initial state. If C(s') is better than C(s), the candidate state s' is "accepted," and becomes the new current state s. Note that determining whether C(s') is "better" than C(s) involves simply determining whether C(s') is lower than C(s) in embodiments where the objective function is formulated so that it should be minimized. It will be appreciated that it is possible to formulate an objective function that should be maximized to improve system performance; in such embodiments, one objective function value is "better" value than another when it is higher.

As seen at block 450, in some instances a candidate s' will be accepted as the new current state even if the resulting objective function value C(s') is not better than the previous value. This accepting of a degraded state is performed randomly, using an acceptance probability function P(s, s', T), that depends on the objective function values C(s) and C(s'), as well as on the temperature T, such that the likelihood of accepting a worse state s' decreases as the temperature decreases. The probability function might be, for example:

$$P(s, s', T) = \exp\left(\frac{C(s) - C(s')}{T}\right),$$

in some embodiments. As seen at block 450, a randomly generated value RAND is compared to P(s, s', T); if RAND is less than P(s, s', T), then state s' is accepted, otherwise it is rejected. Each accepted state is saved, in some embodiments, for later evaluation.

Whether or not the candidate state s' is accepted as the current state, an iteration counter is updated and compared to a maximum number of iterations, as shown at block 460. If the maximum number of iterations is reached, the process concludes, as shown at block 470. Otherwise, the temperature is reduced, as appropriate, as shown at block 480, and the operations shown at blocks 430, 440, 450, and 460 are repeated until the maximum number of iterations is reached. In the illustrated process, the temperature T is reduced by 5% once every four-hundred iterations; other schedules for reducing the temperature T may be used.

At the conclusion of the iterative process shown in FIG. 4, the final "current" state s may be used as the optimal state, in some embodiments, and the necessary changes to scrambling codes determined by comparing this final state to the initial state. In other embodiments, the saved "accepted" states are evaluated, to identify an optimal state from among the accepted states. For example, the state configuration that will traverse the least number of base stations, i.e., requiring the fewest scrambling code changes, while minimizing the network's objective function C(s) may be chosen. The selection of the optimal state from the saved states may reflect a balancing between the number of scrambling code changes that are needed against the expected improvements to the objective function, so that complex system changes that will result in only minimal improvements to the objective function are avoided. For example, given one saved state that requires n changes and another that requires more than n+i changes, the latter state may be adopted as the optimal state only in the event that the expected improvement in the objective function exceeds a predetermined threshold X. This threshold X may be a function of the incremental scrambling code changes i, in some embodiments.

Figure 5:
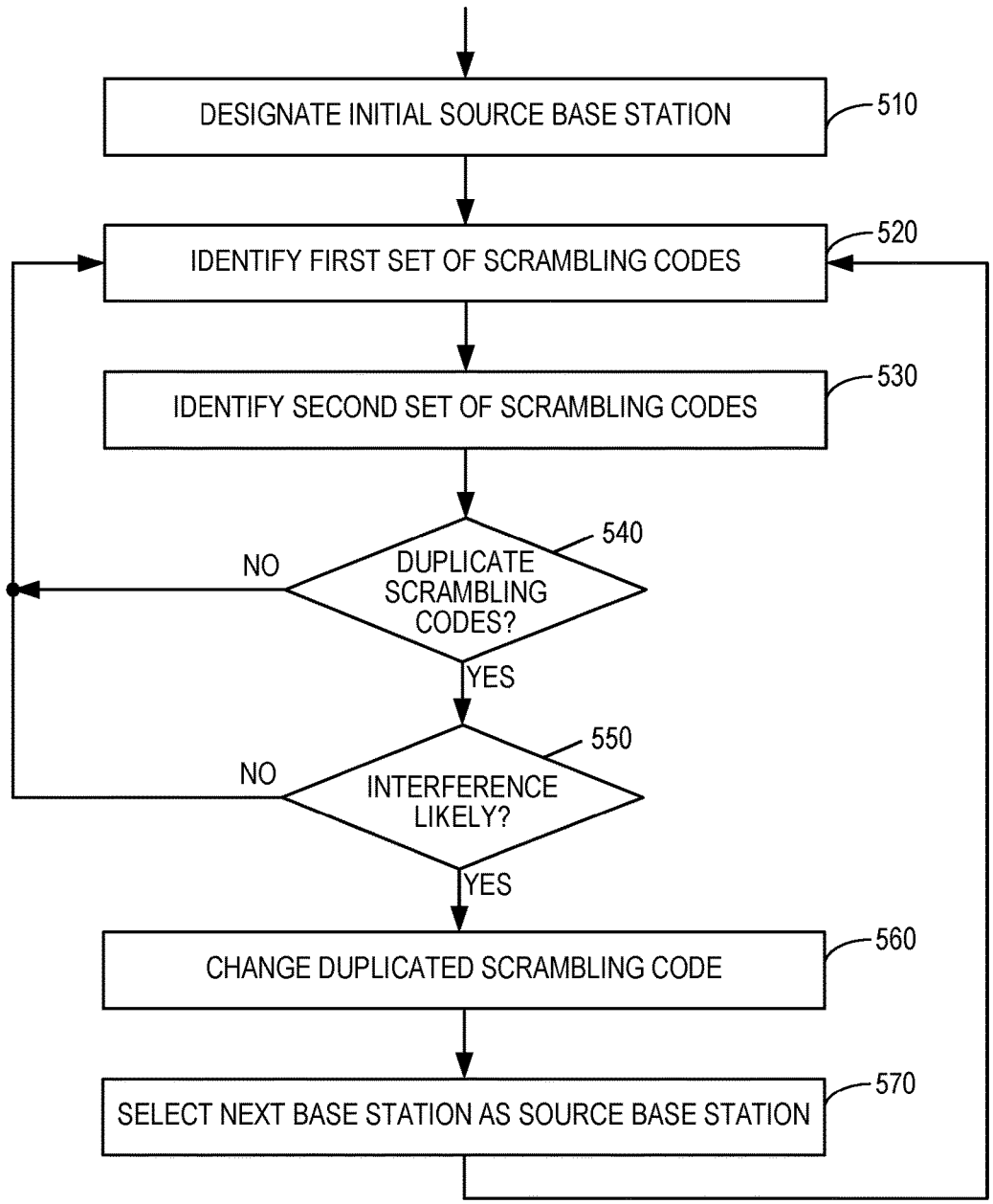
FIG. 5 is a process flow diagram illustrating an example method for detecting and correcting problems in scrambling code allocations, according to some embodiments of the presently disclosed techniques.
Figure 6:
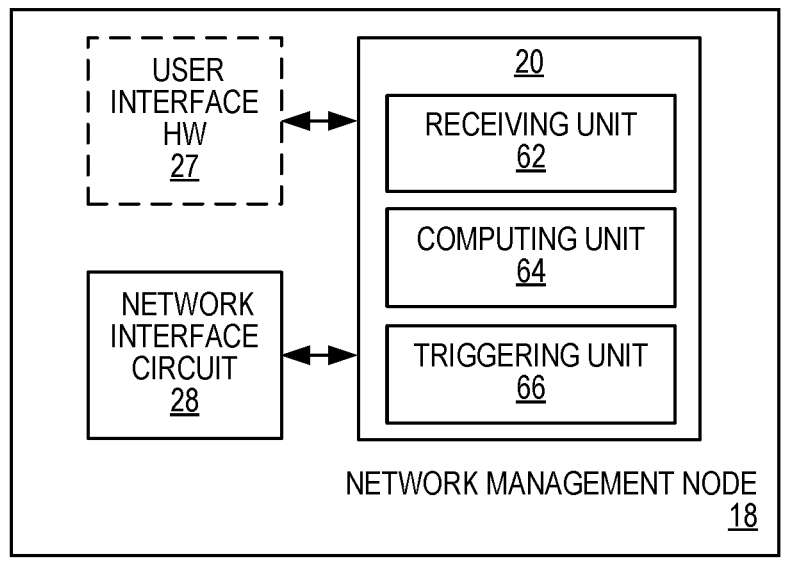
FIG. 6 is a block diagram illustrating another representation of a network management node, according to some embodiments.
Figure 7:
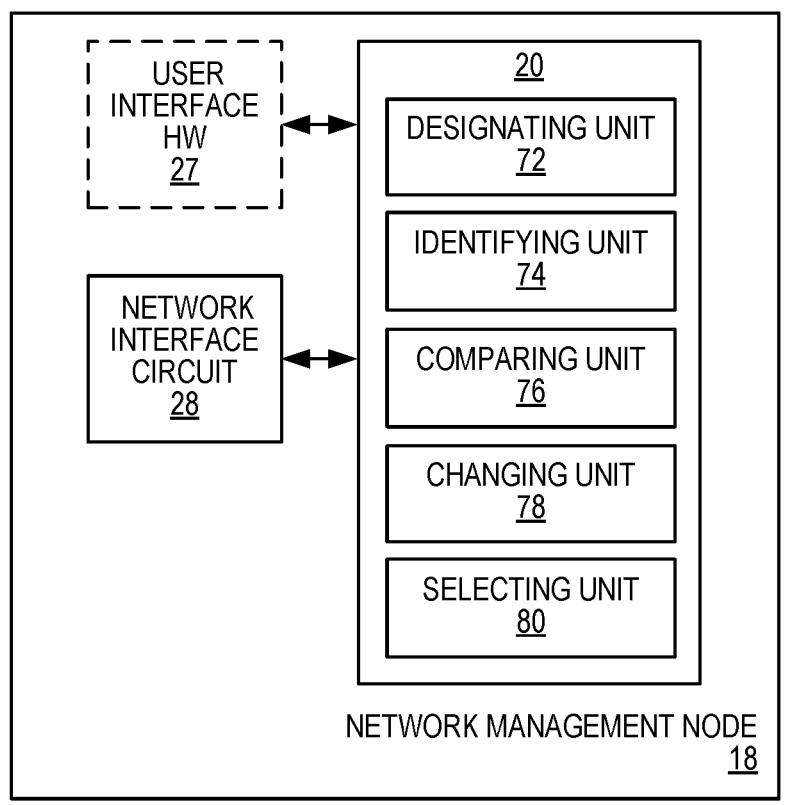
FIG. 7 is a block diagram illustrating still another representation of a network management node, according to some embodiments.

FIG. 5 illustrates an example method for implementation in a network node operatively connected to a wireless network, for detecting and correcting problems with scrambling code allocations among cells supported by a group of base stations in the wireless network, where each base station supports one or more of the cells. As discussed above, this process may be implemented in a network management node operatively connected to one or more base stations in the wireless network or to one or more radio network controllers (RNCs) in the wireless network, in some embodiments. In others, the process may be carried out in an RNC, or in some other network node. The illustrated process may be carried out after a scrambling code reallocation has been performed, e.g., after a process like that illustrated in FIGS. 3 and/or 4 has been carried out. In some embodiments or instances, the illustrated process may be carried out in response to a detected performance problem in the network, or in response to determining that one or more cells have been added to or subtracted from the network, or re-configured.

As shown at block 510, the illustrated process begins with designating an initial one of the group of base stations as a source base station. Next, as shown at block 520, a first set of scrambling codes is identified, the first set of scrambling codes consisting of all scrambling codes allocated to cells supported by the source base station. In addition, as shown at block 530, a second set of scrambling codes is determined, the second set of scrambling codes comprising at least all scrambling codes allocated to cells neighboring any of the cells supported by the source base station. In some embodiments, determining the second set of scrambling codes comprises identifying scrambling codes allocated to cells neighboring any of the cells supported by the source base station using system-configured neighbor relations or using location data corresponding to the cells, or both.

In an important variant, the second set of scrambling codes may include two subsets: a first subset comprising all scrambling codes allocated to cells neighboring any of the cells supported by the source base station and a second subset including or more scrambling codes identified as closely related to one or more of the scrambling codes in the first subset, wherein scrambling codes are identified as closely related based on predetermined relationships between scrambling codes. These predetermined relationships may reflect a priori knowledge of code pairs that are likely to cause inter-cell interference when used in adjacent cells; this a priori may be mathematically derived, e.g., through simulations, or through empirical observation of inter-cell interference.

As shown at block 540, the first and second sets of scrambling codes are compared, to detect duplicate scrambling codes between the first and second sets. Upon the detecting of a duplicated scrambling code between the first and second sets, location information for the cell corresponding to the duplicated scrambling code is used to determine whether interference between the cells is likely, as shown at block 550. In some embodiments, this may comprise comparing a distance between the cells to a cell radius for one or both of the cells to determine whether interference is likely. GPS information identifying the base station locations may be used, for example. In some embodiments, antenna orientation information for the cells corresponding to the duplicated scrambling codes may be used to determine whether interference between the cells is likely. If interference is likely, e.g., because the neighboring cells are located too close together and/or have conflicting antenna orientations, the scrambling code is changed for the cell that has the duplicated scrambling code and that is supported by a base station other than the source base station, as shown at block 560. Changing the scrambling code may require sending a reconfiguration message to the affected RNC, for example. This message may be sent over a 3GPP-defined interface (e.g., the Iur interface) or some other communications interface.

As shown at block 570, the process continues with the selection of a next one of the base stations for designation as the source base station. The identifying, determining, comparing, using, changing, and selecting operations shown in blocks 520-570 are repeated until each one of the base stations has been designated as the source base station.

In some embodiments, the process shown in FIG. 5 may incorporate one or more planned changes to a current scrambling code allocation among the cells. For example, the process shown in FIG. 5 may be carried out after a reallocation of scrambling codes carried out according to the processes shown in FIGS. 3 and/or 4, in which case the changes to the scrambling code allocation are an input to the process of FIG. 5. In this case, the designation of the initial one of the base stations as a source base station may be based on the planned changes to the scrambling code reallocation. Thus, one of those base stations affected by the scrambling code changes may be designated as the initial source base station—in some cases, the base station corresponding to the scrambling code change that is expected to result in the biggest overall change to inter-cell interference may be selected as the initial base station. This may be determined for example, by observing the system state change that resulted in the biggest change to the objective function used in the scrambling code reallocation process. In such embodiments, the identified scrambling codes corresponding to the source base station at each iteration should reflect the one or more changes to be made to the current scrambling code allocation. In subsequent iterations, other base stations affected by the scrambling code reallocation may be selected as source base stations, prior to traversing other base stations in the network.

The processes shown in FIGS. 3, 4, and 5 may be performed on an entire network or only on a portion of a network. For example, one of the processes above may be performed only on a localized portion of a network when new neighboring cells are added to a particular base stations, or when the process is triggered by a performance degradation in a particular area of the network.

As previously mentioned, a network node having a configuration like that shown in FIG. 2 may be used to carry out one or more of the several methods detailed above. This may be a stand-alone network management node, a modified radio network node, or some other node in or attached to the wireless network node. Accordingly, it should be understood that embodiments of the presently disclosed techniques and apparatus include a network management node that comprises communications interface circuitry configured to communicate with one or more nodes in a radio access network (RAN), and a processing circuit configured to control the communications interface circuitry and to carry out a method like that shown in FIG. 3, i.e., to: receive current scrambling code allocation information for the plurality of cells and receive network configuration information for the radio access network; compute a reallocation of scrambling codes to the plurality of cells, based on the current scrambling code allocation information and the network configuration information, using a metaheuristic algorithm; and trigger a change in scrambling code for at least one of the plurality of cells, based on the computed reallocation. Likewise, other embodiments include a network node, comprising communications interface circuitry configured to communicate with one or more nodes in a radio access network (RAN) and a processing circuit configured to control the communications interface circuitry and to carry out a method like that shown in FIG. 5, i.e., to: designate an initial one of the group of base stations as a source base station; identify a first set of scrambling codes, the first set of scrambling codes consisting of all scrambling codes allocated to cells supported by the source base station; determine a second set of scrambling codes, the second set of scrambling codes comprising at least all scrambling codes allocated to cells neighboring any of the cells supported by the source base station; compare the first and second sets of scrambling codes to detect duplicate scrambling codes between the first and second sets; upon detecting a duplicate scrambling code between the first and second sets, use location information for the cells corresponding to the duplicated scrambling code to determine whether interference between the cells is likely and, if interference is likely, change the scrambling code for the cell that has the duplicated scrambling code and that is supported by a base station other than the source base station; select a next one of the base stations for designation as the source base station; and repeat the identifying, determining, comparing, using, changing, and selecting operations until each one of the base stations has been designated as the source base station.

Furthermore, it will be appreciated that the network management node 18 illustrated in FIG. 2, and in particular the processing circuit 20 therein, may be conceived as comprising several functional units, any or each of which may be implemented using one or more processing elements configured with appropriate software, firmware, and/or supporting digital hardware. Thus, FIG. 8 illustrates another representation of network management node 18, which in this case is adapted to carry out a technique like that shown in FIG. 3. Network management node 18 in this case comprising network interface circuitry 28, (optional) user interface hardware 27, and several functional units. These functional units include, in addition to the communications interface circuitry 28, which is configured to communicate with one or more network nodes in a RAN, a receiving unit 62 for receiving, e.g., via the network interface circuit 28, current scrambling code allocation information for the plurality of cells and receiving network configuration information for the radio access network. Also included is a computing unit 64 for computing a reallocation of scrambling codes to the plurality of cells, based on the current scrambling code allocation information and the network configuration information, using a metaheuristic algorithm, and a triggering unit 66 for triggering a change in scrambling code for at least one of the plurality of cells, based on the computed reallocation.

FIG. 9 illustrates another representation of network management node 18, in this case adapted to carry out a technique like that shown in FIG. 5. According to this representation, network management node 18 again includes network interface circuitry 28, (optional) user interface hardware 27, and several functional units. The functional units include a designating unit 72 for designating an initial one of the group of base stations as a source base station, an identifying unit 74 for identifying a first set of scrambling codes, the first set of scrambling codes consisting of all scrambling codes allocated to cells supported by the source base station, and for determining a second set of scrambling codes, the second set of scrambling codes comprising at least all scrambling codes allocated to cells neighboring any of the cells supported by the source base station. A comparing unit 76 is provided, for comparing the first and second sets of scrambling codes to detect duplicate scrambling codes between the first and second sets, and a changing unit 74, upon detecting a duplicated scrambling code between the first and second sets, uses location information for the cells corresponding to the duplicated scrambling code to determine whether interference between the cells is likely and, if interference is likely, changes the scrambling code for the cell that has the duplicated scrambling code and that is supported by a base station other than the source base station. Finally, a selecting unit is provided, for selecting a next one of the base stations for designation as the source base station. The identifying unit 74, comparing unit 76, changing unit 78, and selecting unit 80 are operated in an iterative fashion to carry out the method shown in FIG. 5.

It will be appreciated by the person of skill in the art that various modifications may be made to the above described embodiments without departing from the scope of the present invention. For example, it will be readily appreciated that although the above embodiments are described with reference to parts of one or more 3GPP-based networks, an embodiment of the present invention will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

What is claimed is:

1. A method, in a network node operatively connected to a wireless network, for detecting and correcting problems with scrambling code allocations among cells supported by a group of base stations in the wireless network, where each base station supports one or more of the cells, the method comprising
   designating an initial one of the group of base stations as a source base station;
   identifying a first set of scrambling codes, the first set of scrambling codes consisting of all scrambling codes allocated to cells supported by the source base station;
   determining a second set of scrambling codes, the second set of scrambling codes comprising at least all scrambling codes allocated to cells neighboring any of the cells supported by the source base station;

comparing the first and second sets of scrambling codes to detect duplicate scrambling codes between the first and second sets;

upon detecting a duplicated scrambling code between the first and second sets, using location information for the cells corresponding to the duplicated scrambling code to determine whether interference between the cells is likely and, if interference is likely, changing the scrambling code for the cell that has the duplicated scrambling code and that is supported by a base station other than the source base station; and selecting a next one of the base stations for designation as the source base station; and repeating said identifying, determining, comparing, using, changing, and selecting operations until each one of the base stations has been designated as the source base station.

2. The method of claim 1, further comprising first identifying one or more changes to be made to a current scrambling code allocation among the cells, wherein:

designating the initial one of the base stations as a source base station comprises designating one of those base stations affected by the one or more changes; and the identified set of scrambling codes reflects the one or more changes to be made to the current scrambling code allocation.

3. The method of claim 2, wherein designating the initial one of the base stations as a source base station comprises determining which of the one or more changes to be made to the current scrambling code allocation is expected to result in a highest improvement in inter-cell interference and designating the base station corresponding to that change as the source base station.

4. The method of claim 2, wherein identifying one or more changes to be made to a current scrambling code allocation among the cells comprises:

receiving current scrambling code allocation information for the cells and receiving network configuration information for the group of base stations;

computing a reallocation of scrambling codes to the cells, based on the current scrambling code allocation information and the network configuration information, using a metaheuristic algorithm; and identifying the one or more changes to be made based on the computed reallocation.

5. The method of claim 4, wherein the metaheuristic algorithm is based on an objective function that comprises a summation of interference metrics for each of the cells, wherein the interference metrics depend on scrambling code allocations to the cells.

6. The method of claim 4, wherein the metaheuristic algorithm employs a simulated annealing metaheuristic.

7. The method of claim 1, further comprising using antenna orientation information for the cells corresponding to the duplicated scrambling codes to determine whether interference between the cells is likely.

8. The method of claim 1, wherein determining the second set of scrambling codes comprises identifying scrambling codes allocated to cells neighboring any of the cells supported by the source base station using system-configured neighbor relations or using location data corresponding to the cells, or both.

9. The method of claim 1, wherein determining the second set of scrambling codes comprises including in the second set a first subset comprising all scrambling codes allocated to cells neighboring any of the cells supported by the source base station and further including in the second set one or more scrambling codes identified as closely related to one or more of the scrambling codes in the first subset, wherein scrambling codes are identified as closely related based on predetermined relationships between scrambling codes.

10. The method of claim 1, wherein using location information for the cells corresponding to the duplicated scrambling codes to determine whether interference between the cells is likely comprises comparing a distance between the cells to a cell radius for one or both of the cells to determine whether interference is likely.

11. The method of claim 1, wherein the network node is a network-management node operatively connected to one or more base stations in the wireless network or to one or more radio network controllers in the wireless network, or to one or more of each.

12. The method of claim 1, wherein the network node is a radio network controller controlling a plurality of the base stations.

13. A network node, comprising communications interface circuitry configured to communicate with one or more nodes in a radio access network and a processing circuit configured to control the communications interface circuitry and to:

designate an initial one of a group of base stations in the radio access network as a source base station;

identify a first set of scrambling codes, the first set of scrambling codes consisting of all scrambling codes allocated to cells supported by the source base station;

determine a second set of scrambling codes, the second set of scrambling codes comprising at least all scrambling codes allocated to cells neighboring any of the cells supported by the source base station;

compare the first and second sets of scrambling codes to detect duplicate scrambling codes between the first and second sets;

upon detecting a duplicated scrambling code between the first and second sets, use location information for the cells corresponding to the duplicated scrambling code to determine whether interference between the cells is likely and, if interference is likely, change the scrambling code for the cell that has the duplicated scrambling code and that is supported by a base station other than the source base station;

select a next one of the base stations for designation as the source base station; and repeat said identifying, determining, comparing, using, changing, and selecting operations until each one of the base stations has been designated as the source base station.

14. The network node of claim 13, wherein the processing circuit is configured to first identify one or more changes to be made to a current scrambling code allocation among the cells, and wherein the processing circuit is further configured to designate the initial one of the base stations as a source base station by designating one of those base stations affected by the one or more changes, and wherein the identified set of scrambling codes reflects the one or more changes to be made to the current scrambling code allocation.

15. The network node of claim 14, wherein the processing circuit is configured to designate the initial one of the base stations as a source base station by determining which of the one or more changes to be made to the current scrambling code allocation is expected to result in a highest improvement in inter-cell interference and designating the base station corresponding to that change as the source base station.

16. The network node of claim 14, wherein the processing circuit is configured to identify one or more changes to be made to a current scrambling code allocation among the cells by:
receiving current scrambling code allocation information for the cells and receiving network configuration information for the group of base stations;
computing a reallocation of scrambling codes to the cells, based on the current scrambling code allocation information and the network configuration information, using a metaheuristic algorithm; and
identifying the one or more changes to be made based on the computed reallocation.

17. The network node of claim 16, wherein the metaheuristic algorithm is based on an objective function that comprises a summation of interference metrics for each of the cells, wherein the interference metrics depend on scrambling code allocations to the cells.

18. The network node of claim 16, wherein the metaheuristic algorithm employs a simulated annealing metaheuristic.

19. The network node of claim 13, wherein the processing circuit is further configured to use antenna orientation information for the cells corresponding to the duplicated scrambling codes to determine whether interference between the cells is likely.

20. The network node of claim 13, wherein the processing circuit is configured to determine the second set of scrambling codes by identifying scrambling codes allocated to cells neighboring any of the cells supported by the source base station using system-configured neighbor relations or using location data corresponding to the cells, or both.

21. The network node of claim 13, wherein the processing circuit is configured to determine the second set of scrambling codes by including in the second set a first subset comprising all scrambling codes allocated to cells neighboring any of the cells supported by the source base station and further including in the second set one or more scrambling codes identified as closely related to one or more of the scrambling codes in the first subset, wherein scrambling codes are identified as closely related based on predetermined relationships between scrambling codes.

22. The network node of claim 13, wherein the processing circuit is configured to use location information for the cells corresponding to the duplicated scrambling codes to determine whether interference between the cells is likely by comparing a distance between the cells to a cell radius for one or both of the cells to determine whether interference is likely.

23. The network node of claim 13, wherein the network node is a network-management node operatively connected to one or more base stations in the wireless network or to one or more radio network controllers in the wireless network, or to one or more of each.

24. The network node of claim 13, wherein the network node is a radio network controller controlling a plurality of the base stations.

\* \* \* \* \*